United States Patent
Tiberghien et al.

(10) Patent No.: US 10,024,472 B2
(45) Date of Patent: Jul. 17, 2018

(54) QUICK-ACTING COUPLING FOR THE DISCONNECTABLE CONNECTION OF TWO PIPELINES

(71) Applicant: STAUBLI FAVERGES, Faverges (FR)

(72) Inventors: Alain-Christophe Tiberghien, Sevrier (FR); Christophe Durieux, Gilly sur Isere (FR); Igor Bahno, Ugine (FR)

(73) Assignee: STAUBLI FAVERGES, Faverges (FR)

( * ) Notice: Subject to any disclaimer, the term of this patent is extended or adjusted under 35 U.S.C. 154(b) by 809 days.

(21) Appl. No.: 14/535,518

(22) Filed: Nov. 7, 2014

(65) Prior Publication Data

US 2016/0169430 A1 Jun. 16, 2016

(30) Foreign Application Priority Data

Dec. 2, 2013 (FR) ..................................... 13 61960

(51) Int. Cl.
*F16L 39/00* (2006.01)
*F16L 37/084* (2006.01)
*F16L 37/42* (2006.01)

(52) U.S. Cl.
CPC ........... *F16L 37/0841* (2013.01); *F16L 37/42* (2013.01)

(58) Field of Classification Search
CPC ...... F16L 37/0841; F16L 37/086; F16L 37/42
USPC ........................................... 285/317, 81, 82
See application file for complete search history.

(56) References Cited

U.S. PATENT DOCUMENTS

| 4,311,328 | A | * | 1/1982 | Truchet | F16L 37/0841 285/308 |
|---|---|---|---|---|---|
| 4,483,510 | A | * | 11/1984 | Palau | F16L 37/0841 137/596 |
| 5,002,254 | A | * | 3/1991 | Belisaire | F16L 37/0841 251/149.8 |
| 5,695,223 | A | * | 12/1997 | Boticki | F16L 37/0841 285/23 |
| 5,806,832 | A | * | 9/1998 | Larbuisson | F16L 37/0841 251/149.6 |
| 5,845,943 | A | | 12/1998 | Ramacier, Jr. et al. | |

(Continued)

FOREIGN PATENT DOCUMENTS

| CN | 1502839 A | 6/2004 |
|---|---|---|
| CN | 1609496 A | 4/2005 |

(Continued)

OTHER PUBLICATIONS

French Search Report dated Jul. 29, 2014, FR 1361960, 2 pages.

*Primary Examiner* — Aaron M Dunwoody

(57) ABSTRACT

A quick-acting coupling for the disconnectable connection of two pipelines (C1, C2) which has a female element (A) equipped with a locking device (6) slidingly mounted in a body (1) of the female element and equipped with a raised portion-and wherein the locking device is movable between a first position in which the raised portion cooperates with a flange (102) of a male part (B), and a second position in which the locking device allows the male part to release itself from the female element, and wherein a safety device retains the locking device in the first position when the male part is in the configuration fitted in the female element and wherein when the locking device is in the first position, a force on the safety device releases the locking device from the first position.

16 Claims, 12 Drawing Sheets

(56) References Cited

U.S. PATENT DOCUMENTS

| | | | |
|---|---|---|---|
| 8,231,145 B2* | 7/2012 | Blivet | F16L 37/0841 |
| | | | 285/288.1 |
| 2002/0093194 A1 | 7/2002 | Lacroix et al. | |
| 2004/0094739 A1* | 5/2004 | Lacroix | F16L 37/0841 |
| | | | 251/149.1 |
| 2005/0197000 A1 | 9/2005 | Tiberghien et al. | |
| 2009/0085348 A1 | 4/2009 | Tiberghien et al. | |
| 2014/0353961 A1* | 12/2014 | Milhas | F16L 37/0841 |
| | | | 285/82 |
| 2015/0076815 A1* | 3/2015 | Lombardi, III | A61M 39/1011 |
| | | | 285/317 |

FOREIGN PATENT DOCUMENTS

| | | |
|---|---|---|
| CN | 101133276 A | 2/2008 |
| CN | 201651630 U | 11/2010 |
| EP | 1219885 A1 | 7/2002 |
| FR | 2511115 A1 | 2/1983 |
| FR | 2865259 A1 | 7/2005 |
| JP | 02225898 A | 9/1990 |

* cited by examiner

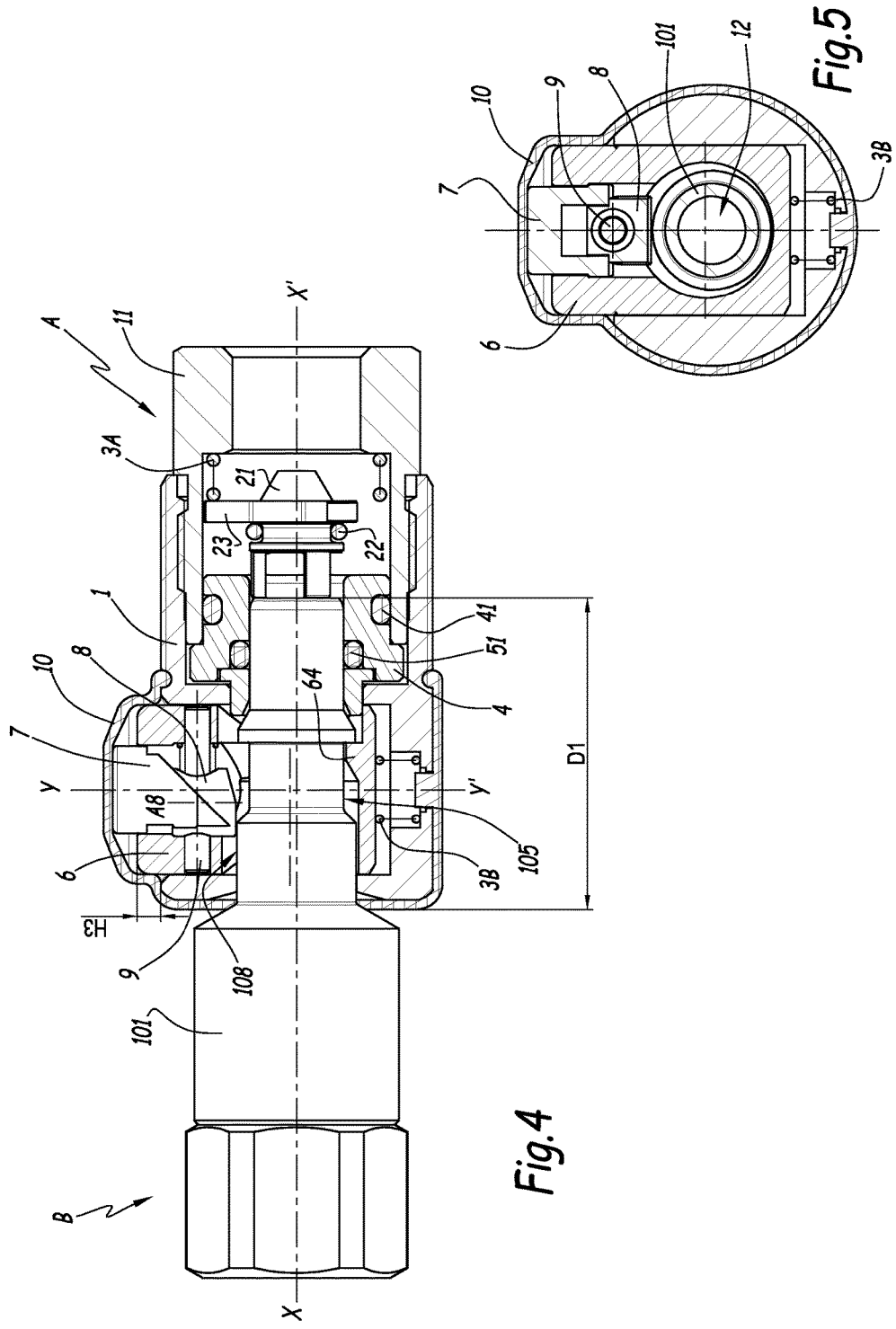

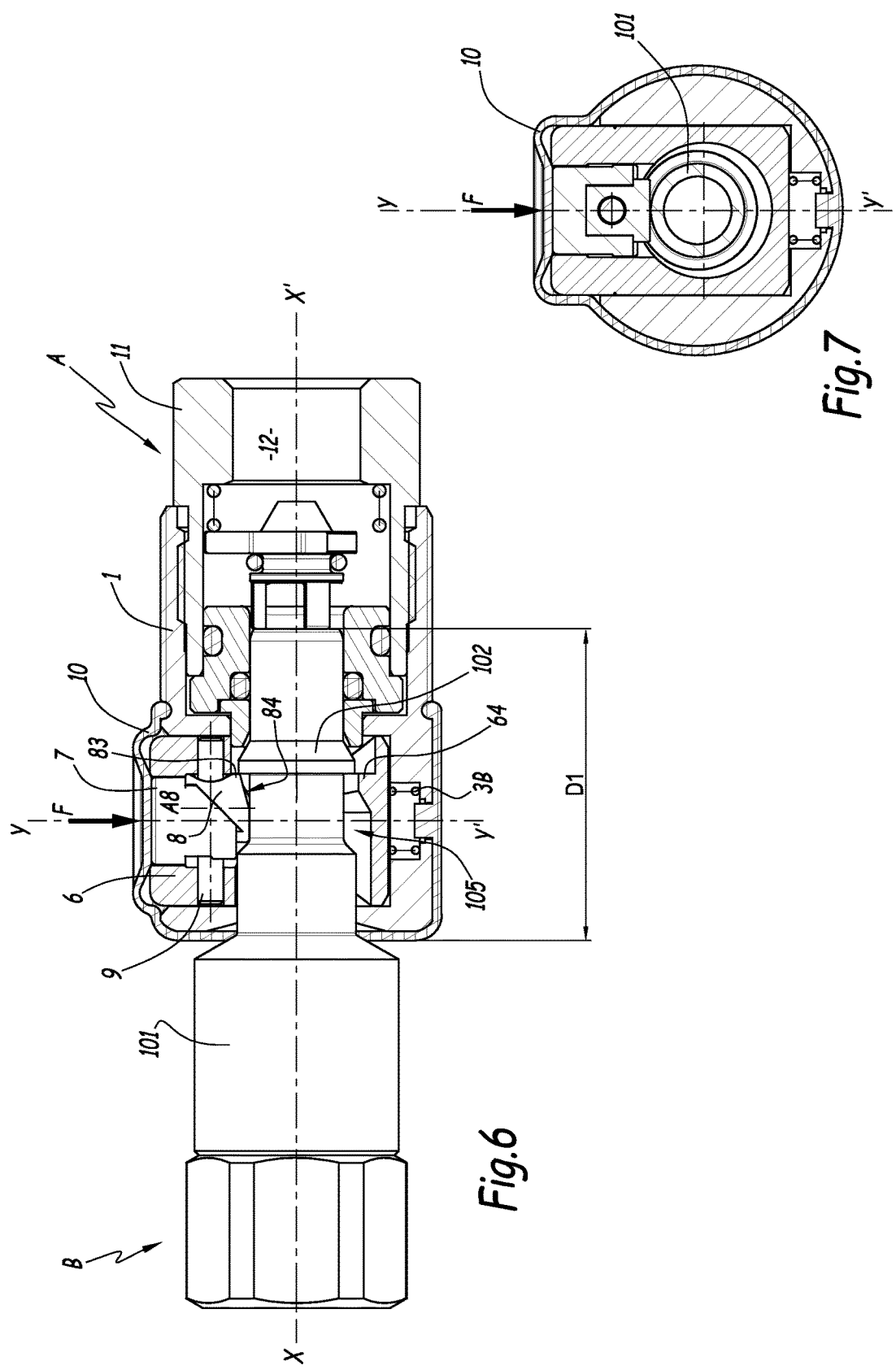

QUICK-ACTING COUPLING FOR THE DISCONNECTABLE CONNECTION OF TWO PIPELINES

BACKGROUND OF THE INVENTION

Field of the Invention

The present invention relates to a quick-acting coupling for the disconnectable connection of two pipelines traveled by a fluid.

The quick-acting couplings are suitable for polluted atmospheres and make it possible to connect flexible pipelines in systems subject to vibrations, in particular motorized vehicles equipped with hoses in areas that are difficult to access.

Brief Description of the Related Art

In the field of vehicles, in particular military vehicles, quick-acting couplings are used to supply sub-systems with water, fuel, air or gas by means of different pipelines.

Known from patent FR-B-2,865,259 is a quick-acting coupling that comprises two male and female elements able to fit axially into each other and causing a gate mounted in the body of the female element to open. This body is equipped with a loaded bolt, slidingly mounted in the body and pierced with a central opening for fitting of the male element. The bolt has two parts and an axially loaded safety member can block the bolt.

In order to disconnect the male element and the female element, it is necessary to exert an additional fitting force in order to push the male element further into the female element, then to exert a force on the bolt. Thus, the unlocking of the male and female elements is complicated and requires the user to use both hands, in a maneuvering area that is often restricted.

Furthermore, when the male and female elements are fitted together, the vibrations to which the coupling is subjected tend to move the movable elements of the connector by inertial effect. These parasitic movements risk bringing the locking mechanisms into an unlocked position, in which the male element is free to leave the female element.

Patent FR-A-1,487,324 discloses a coupling with a bolt that is equipped with a stud for blocking the bolt in its locked position. To separate the elements of the coupling, it is necessary first to exert an action on the stud in order to unblock the bolt, then to unlock the two coupling elements. Thus, to separate the male and female elements, it is necessary to perform two successive maneuvers along two distinct maneuvering axes.

Furthermore, the coupling according to FR-A-1,487,324 does not make it possible to incorporate a protective cap preventing the intrusion of polluting bodies because the stud must remain accessible, which is harmful for the lifetime of the coupling.

SUMMARY OF THE INVENTION

The invention more particularly aims to resolve these drawbacks by proposing a quick-acting coupling with an easy disconnection, and making it possible to integrate an effective tight system for protecting the coupling in polluted settings.

In fact, the invention relates to a quick-acting coupling for the removable junction of two pipelines traveled by a fluid, the coupling comprising a male part and a female element that can fit into one another along a longitudinal axis. The female element is equipped with:

a locking device slidingly mounted in a body of the female element along a radial axis and pierced with at least one opening for fitting the male part. One wall of the opening is equipped with a first retaining means. The locking device is movable between:
 a first position in which the first retaining means can cooperate with a corresponding second retaining means of the male part to keep the male part in the female element at a first fitting depth in the fitted fluid passage configuration,
 a second position in which the locking device allows the male part to release the female element outside the first fitting depth,
a safety device able to keep the locking device in its first position when the male part is in the configuration fitted in the female element.

When the locking device is in its first position, an action on the safety device along the radial axis releases the locking device from its first position.

Owing to the invention, an action on the safety device makes it possible, in a single gesture and using only one hand, to unlock the locking device, automatically causing the male element to exit the female element. The safety device is incorporated within the locking device, such that it remains compact. Such a safety device is suitable for placing a protective cap around the mouth of the female element and the safety device, which makes it possible to protect the coupling from dust or foreign bodies.

According to advantageous, but optional aspects of the invention, such a coupling may incorporate one or more of the following features, considered in any technically allowable combination:

The safety device comprises a safety member slidably mounted on a shaft extending perpendicular to the radial axis. The safety member is movable between:
 a first position in which the locking device locks the male part and the female element in the fitted configuration and in which the safety member can bear radially on the male part on a zone diametrically opposite the first retaining means, and
 a second position in which the safety member does not bear on the male part.
The safety device comprises elastic means that tend to push the safety member back into its first position.
The safety device comprises a button partially housed in the locking device and movable along the radial axis in the locking device.
The action exerted on the button causes the button to move between an idle position and an unlocked position.
The manual action exerted on the button causes the safety member to move from its first position to its second position.
The movement of the safety member along the longitudinal axis causes the button to move along the radial axis.
The button and the safety member each comprise an oblique surface extending in a plane forming a non-zero angle with a longitudinal plane perpendicular to the radial axis. A normal to the oblique surfaces extends in a plane passing through the longitudinal axis and the radial axis. During the movement of the safety member from its first position to its second position, the oblique surfaces of the button and the safety member slide in surface contact against each other.

The angle is equal to 45°.

The male part comprises an adapter housed inside the female element and comprising beads radially movable and able to maintain a male tip of the coupling in the configuration fitted in the adapter, when the locking device is in a first position in which it keeps the adapter at a first fitting depth of the adapter in the female element and in the fitted fluid passage configuration.

The safety device comprises an additional retaining means, such as a tooth, able to keep the male part fitted in the female element when the locking device is kept in its second position.

The locking device comprises a first part and a second part housed inside the first part.

The locking device comprises additional retaining means able to retain the male part in the female element at a second fitting depth in a configuration closing off the fluid passage between the pipelines.

During an intermediate connection step, the male part pushes the safety member back toward its second position.

A tight and flexible enclosure is positioned on the female element, and covers the button and the locking device, in particular a cap made from an elastic material.

BRIEF DESCRIPTION OF THE DRAWINGS

The invention will be better understood and other advantages thereof will appear more clearly upon reading the following description of four embodiments of a coupling according to the invention, provided solely as an example and done in reference to the appended drawings, in which:

FIG. 4 is a partial cross-section of the coupling of FIG. 1 in the connected configuration;

FIG. 5 is a cross-section along line Y-Y' in FIG. 4;

FIG. 6 is a partial cross-section of the coupling of FIG. 1 at the end of the first disconnection step;

FIG. 7 is a cross-section along line Y-Y' in FIG. 6;

DESCRIPTION OF THE PREFERRED EMBODIMENTS

Figure 1:
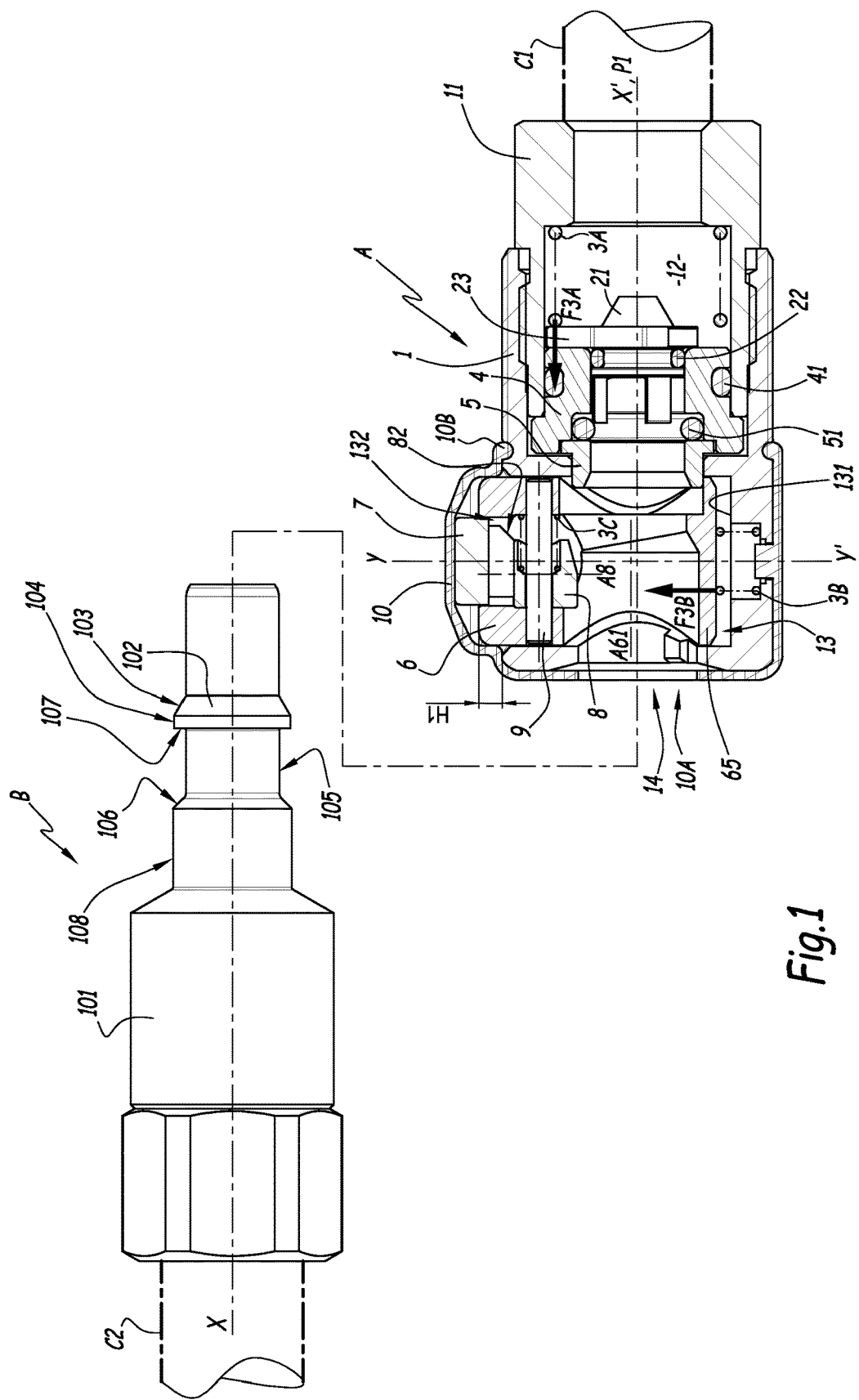
FIG. 1 is a partial cross-section of a male element and a female element of a coupling according to the invention, in the disconnected configuration, extending along a longitudinal axis shown in broken lines, the male element being aligned on the longitudinal axis.

The coupling shown in FIGS. 1 to 11 is of the single-pulse type or single actuation type with an anti-whiplash device, and comprises a female element A and a complementary male part, which is made up of a male element or tip B in this embodiment. The elements A and B are provided to fit into one another in the direction of an axis X-X', which is a longitudinal axis shared by the elements A and B.

The elements A and B are respectively connected to an upstream pipeline C1 and a downstream pipeline C2. The upstream pipeline C1 in turn is connected to a pressurized fluid source (not shown), for example a pressurized air source, the pipeline C2 in turn for example being connected to a pneumatic member of a land-based vehicle.

The coupling is provided for fluids with a pressure varying between 2 and 300 bars.

Alternatively, the fluid flows from the pipeline C2 to the pipeline C1, the terms upstream and downstream then being reversed.

Within the meaning of the present invention, a proximal part of one of the elements A and B is a part turned toward or near the pipeline C1 or C2, connected on that element A or B, while a distal part is a part turned toward or near the other element when those elements are across from each other, ready to be fitted together.

A body 1 of the female element A has a globally cylindrical outer shape with a circular base, centered on the axis X-X', which is also the longitudinal axis of an inner pipe 12 of the body 1, in which a gate 2 movable along the axis X-X' is positioned.

The gate 2 is subjected to the action of elastic means such as a return spring 3A that exerts a force F3A tending to press protuberances 23 of a head 21 of the gate 2, provided with an O-ring 22, against a support ring 4 mounted inside the body 1 and immobilized by a coupling element 11 screwed into the body 1, on the side of the upstream pipeline C1. An O-ring 41 is inserted radially, i.e., in a direction perpendicular and secant to the axis X-X', between the support ring 4 and the coupling element 11.

A ring 5 provided with an annular flange is inserted along the axis X-X' between the body 1 of the female element A and the support ring 4. An O-ring 51 is positioned in a groove delimited on either side by the support ring 4 and the ring 5.

The body 1 is provided with a blind housing 13 extending locally in the direction of an axis Y-Y' perpendicular and secant to the axis X-X', i.e., radial relative to the body 1. Mounted inside the housing 13, sliding along the axis Y-Y', is a locking device made up of a bolt 6 on which elastic means, such as a compression spring 3B, exert a force F3B oriented radially opposite a bottom 131 of the housing 13, i.e., toward an outlet 132 of the housing 13.

Figure 10:
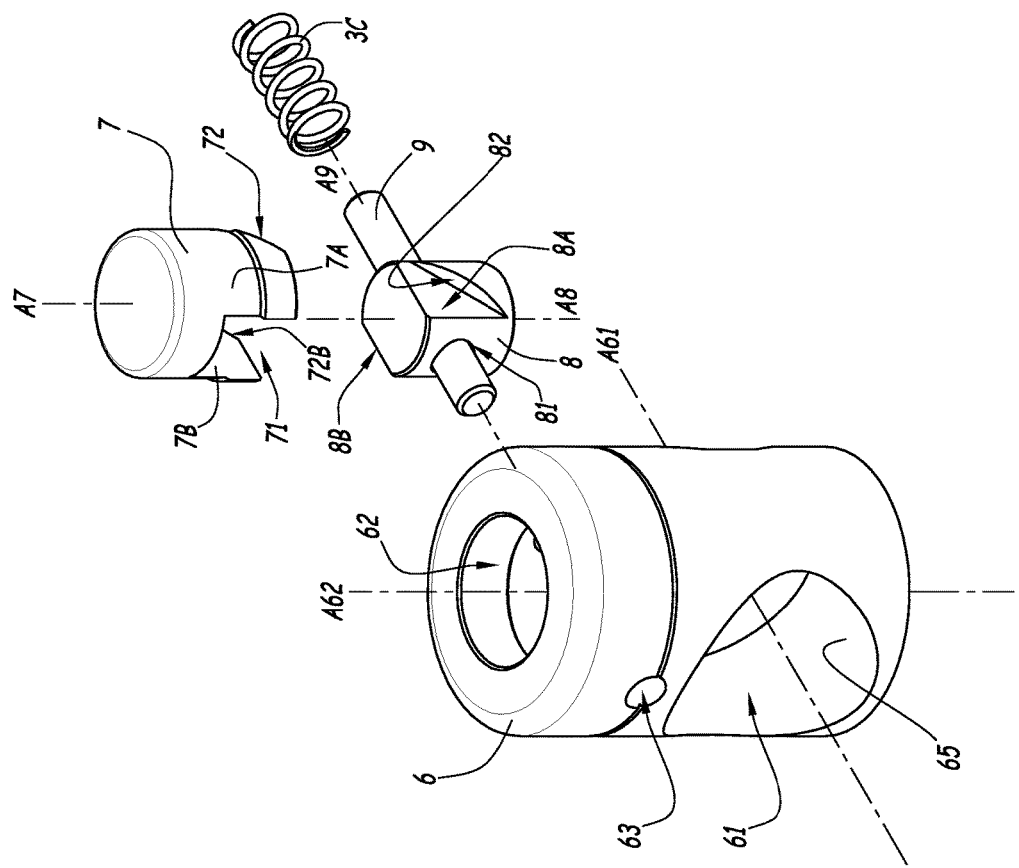
FIG. 10 is an exploded perspective view of a safety device equipping the female element of the coupling of FIG. 1.
Figure 11:
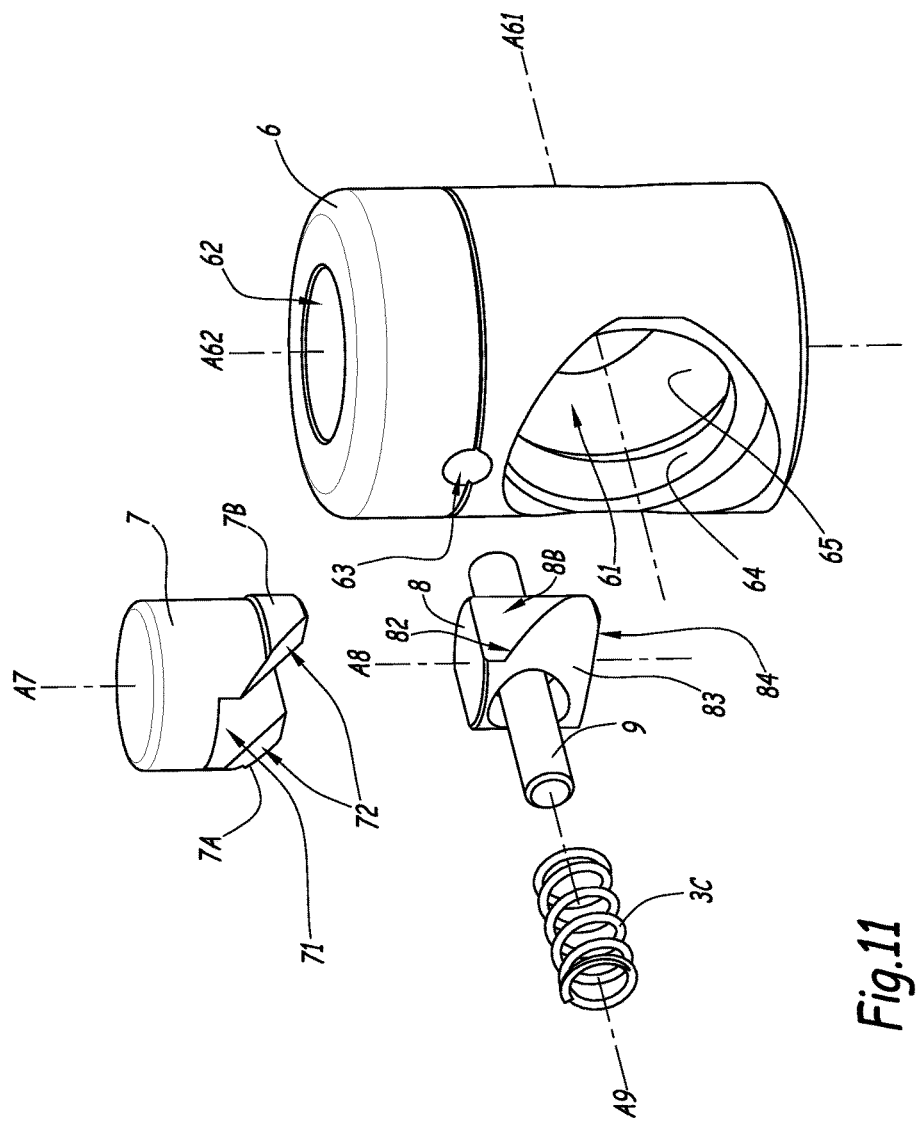
FIG. 11 is an exploded perspective view, from another angle, of the safety device of FIG. 10.

The bolt 6, which is better visible in FIGS. 10 and 11, comprises a through opening 61 centered on an axis A61 parallel to the longitudinal axis X-X' and provided to receive a body 101 of the male element B.

A radial opening 62 of the bolt 6 emerges, along the axis Y-Y', at an upper end of the bolt 6 situated on the side of the outlet 132 of the blind housing 13 of the body 1. Opposite the outlet 132, the opening 62 is delimited by a lower end of the bolt 6 formed by a bottom wall 65. The bottom wall 65 is situated, along a central axis A62 of the opening 62 coinciding with the axes Y-Y', opposite the outlet of the opening 62, in other words, on the side of the bottom 131 of the blind housing 13. Along the axis A62, the opening 62 also emerges in the through opening 61.

Two coaxial holes 63 extending along an axis A9 globally parallel to the axis X-X' are arranged in the bolt 6 and receive the ends of a shaft 9 housed inside the bolt 6.

The bottom wall 65 of the bolt 6 is equipped with first retaining means formed by a raised portion 64 with a globally annular shape and centered on the axis A61. The raised portion 64 includes a frustoconical surface 642, the diameter of which increases along the axis X-X' in a direction going from the distal end toward the proximal end of the female element A. The frustoconical surface 642 is extended on the side of the proximal end of the female element A by a cylindrical surface 644, the diameter of which is smaller than that of the through opening 61.

In the absence of outside action on the female element A, the spring 3B pushes the bottom wall 65 of the bolt 6 back against the flanged bush 5, which is partially housed inside the through opening 61.

A safety member 8 is slidingly mounted on the shaft 9, in the through opening 61, along the axis A9. The safety member 8 includes a hole 81 inside which the shaft 9 extends.

The shape of the safety member 8 fits inside a cylindrical enclosure with a circular base centered on an axis A8, and includes two flats portions 8A and 8B that are parallel to the axes X-X' and Y-Y'. The axis A8 is coaxial with the axes Y-Y' and A62. Each flat portion 8A and 8B has a globally triangular shape, one diagonal of that triangle being adjacent to an oblique surface 82. The oblique surfaces 82 are coplanar and, in the assembled configuration of the female element A, they extend in a plane that forms a non-zero angle α with a longitudinal plane P1 that passes through the axis X-X' and is perpendicular to the axis Y-Y'.

The diameter of the cylindrical enclosure in which the safety member 8 fits is strictly smaller than the diameter of the opening 62 of the bolt 6, such that the safety member 8 is translatable parallel to the axis X-X' and along the shaft 9, relative to the bolt 6.

The safety member 8 includes an inclined proximal surface 84 turned toward the axis X-X'.

Elastic means such as a compression spring 3C are mounted around the shaft 9 and bear against an inner wall of the bolt 6 delimiting the opening 62 and against the safety member 8. By default, the spring 3C pushes the safety member 8 back against the inner wall of the bolt 6, toward the mouth 14 of the female element A, i.e., toward the distal end of the female element A.

A button 7 is mounted on the safety member 8 and extends partially inside the opening 62. Thus, the button 7 is partially housed in the bolt 6 and emerges outside the bolt 6 when the coupling is in a fitted fluid passage configuration.

The button 7 has a generally cylindrical shape with a circular base, and extends along an axis A7 aligned with the axis A62 of the bolt 6 and with the axis Y-Y'. The button 7 can be actuated manually toward the inside of the body 1, from the outside of that body.

The diameter of the cylindrical enclosure of the button 7 is substantially equal to the diameter of the opening 62 of the bolt 6, such that the button 7 is slidingly mounted in the through opening 61 of the bolt 6, along the axis Y-Y'.

A slot 71 is arranged in the button 7 parallel to the axis A9 and receives the safety member 8, which is blocked on either side of the slot 71 by side walls 7A and 7B of the button 7. The side walls 7A and 7B each include an oblique surface 72 extending in a plane that forms a non-zero angle α with the longitudinal plane P1. The angle α is equal to the angle delimited between the oblique surfaces 82 of the safety member 8 and the longitudinal plane P1. In the assembled configuration of the female element A, the oblique surfaces 72 of the button 7 come into contact with the oblique surfaces 82 of the safety member 8.

A tight enclosure such as a protective cap or sleeve 10 made from a flexible and elastic material, for example a rubber material such as an elastomer, is positioned on the body 1 of the female element A, on the side of the mouth 14, and covers the bolt 6 and the button 7 so as to protect them from outside pollution. Thus, the button 7 is protected while remaining maneuverable. The protective cap 10 includes an opening 10A emerging in the pipe 12 of the body 1, for the insertion of the male element B. An annular bead 10B of the cap 10 is positioned in a corresponding groove of the body 1, to maintain the cap 10 in position on the body 1.

When the female element A is used with the button 7 oriented upward, as shown in FIG. 1, the button 7 is retained in the bolt 6 by gravity.

When the button 7 is oriented downward, the button 7 tends to separate from the body 1 of the female element A. The sleeve 10 surrounds the outer part of the bolt 6 and the button 7, so as to prevent the button 7 from separating from the body 1 of the female element A.

The button 7, the safety member 8, the shaft 9 and the spring 3C constitute a safety device able to block the bolt 6 in the locked position.

The body 101 of the male element B includes an annular groove 105, delimited on one side by a distal annular flange 102, and on the other side by a first frustoconical proximal surface 106, the diameter of which decreases in a direction going from the proximal end toward the distal end of the male element B. Along the axis X-X' and opposite the groove 105, the frustoconical surface 106 is extended by a cylindrical surface 108, the diameter of which is larger than that of the bottom of the groove 105.

The flange 102 includes a cylindrical outer surface 104, the diameter of which is larger than that of the bottom of the groove 105, such that a shoulder 107 perpendicular to the axis X-X' adjoins the distal end of the groove 105. The safety member 8 has a proximal end 83 turned toward the pipeline C1 and able to come into contact against the shoulder 107.

The cylindrical surface 104 is extended, opposite the groove 105, by a frustoconical surface 103, the diameter of which decreases in a direction going from the proximal end toward the distal end of the male element B.

FIG. 1 shows the male element B and the female element A in a disconnected configuration. In this configuration, the spring 3A pushes the gate 2 back toward the mouth 14 of the female element A, in a first position, or closed position, such that the inner pipe 12 of the female element A is obstructed by the gate 2, the O-ring 22 being pressed radially against the ring 4.

The spring 3B pushes the bolt 6 back opposite the bottom 131 of the blind housing 13, in a first position, or deployed position, in which the bolt 6 abuts against the flanged bush 5 and protrudes past the body 1 by a first height H1.

The spring 3C pushes the safety member 8 back toward the mouth 14 of the female element A, against the bolt 6 in a first position, or distal position. In that position, the axis A8 of the safety member 8 is offset on the side of the mouth 14 of the female element A relative to the axes Y-Y' and A62 and A7.

The button 7 is kept in a high position, or idle position, relative to the body 1 of the female element A because the oblique surfaces 72 of the button 7 rest against the oblique surfaces 82 of the safety member 8.

Figure 2:
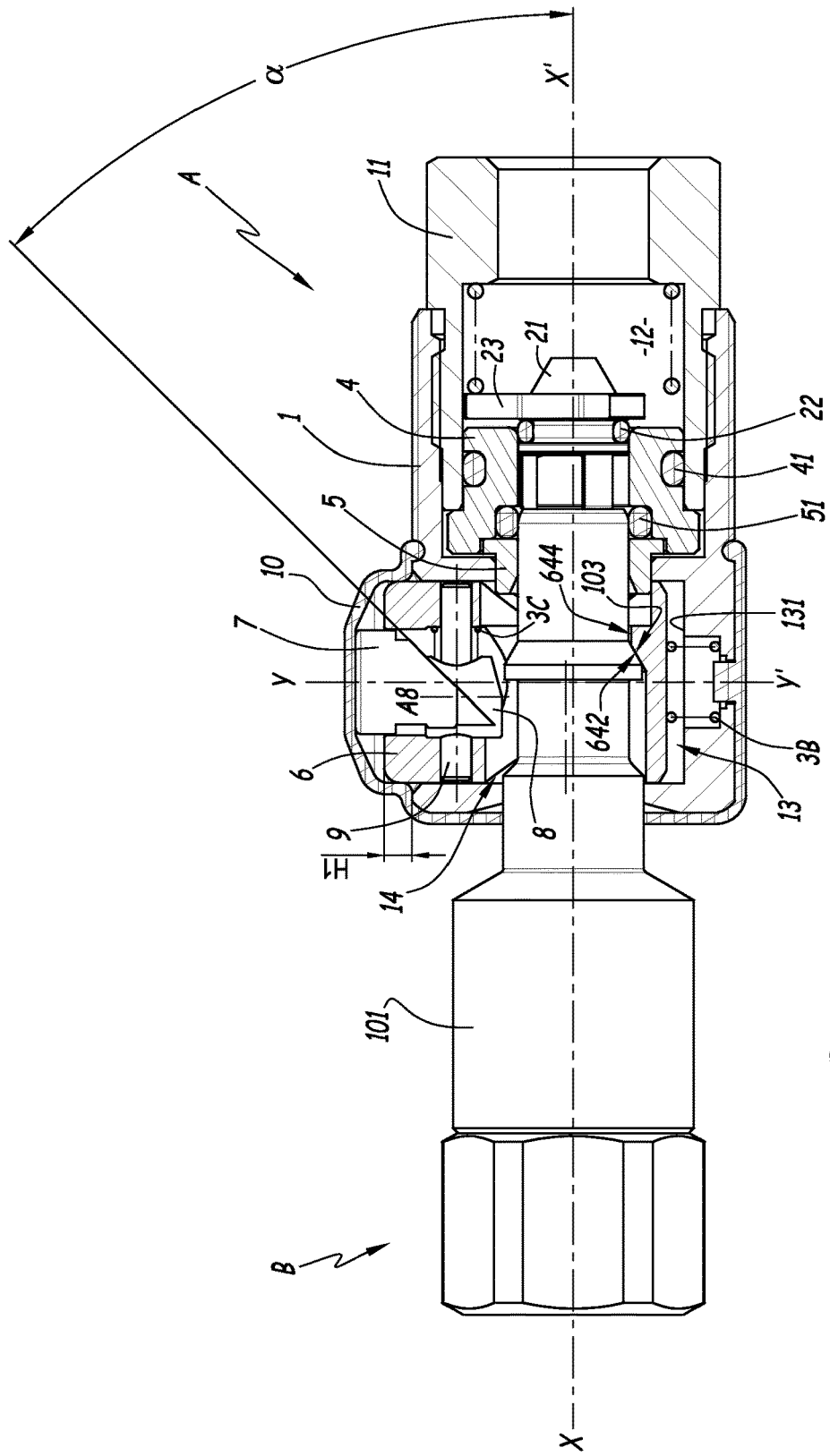
FIGS. 2 and 3 are partial cross-sections of the coupling of FIG. 1, at the end of first and second connection steps, respectively.

FIG. 2 shows the coupling at the end of the first connection step, in which the male element B is inserted into the mouth 14 of the female element A until it abuts against the gate 2 and begins to push the latter back against the return force F3A of the spring 3A. The first frustoconical surface 103 of the male element B comes into contact with the frustoconical surface 642 of the raised portion 64 of the bolt 6.

During the first connection step, the male element B does not interact with the safety member 8, which remains abutting against the bolt 6, on the side of the mouth 14 in its distal position. In other words, the safety member 8 does not bear on the male element B.

Figure 3:
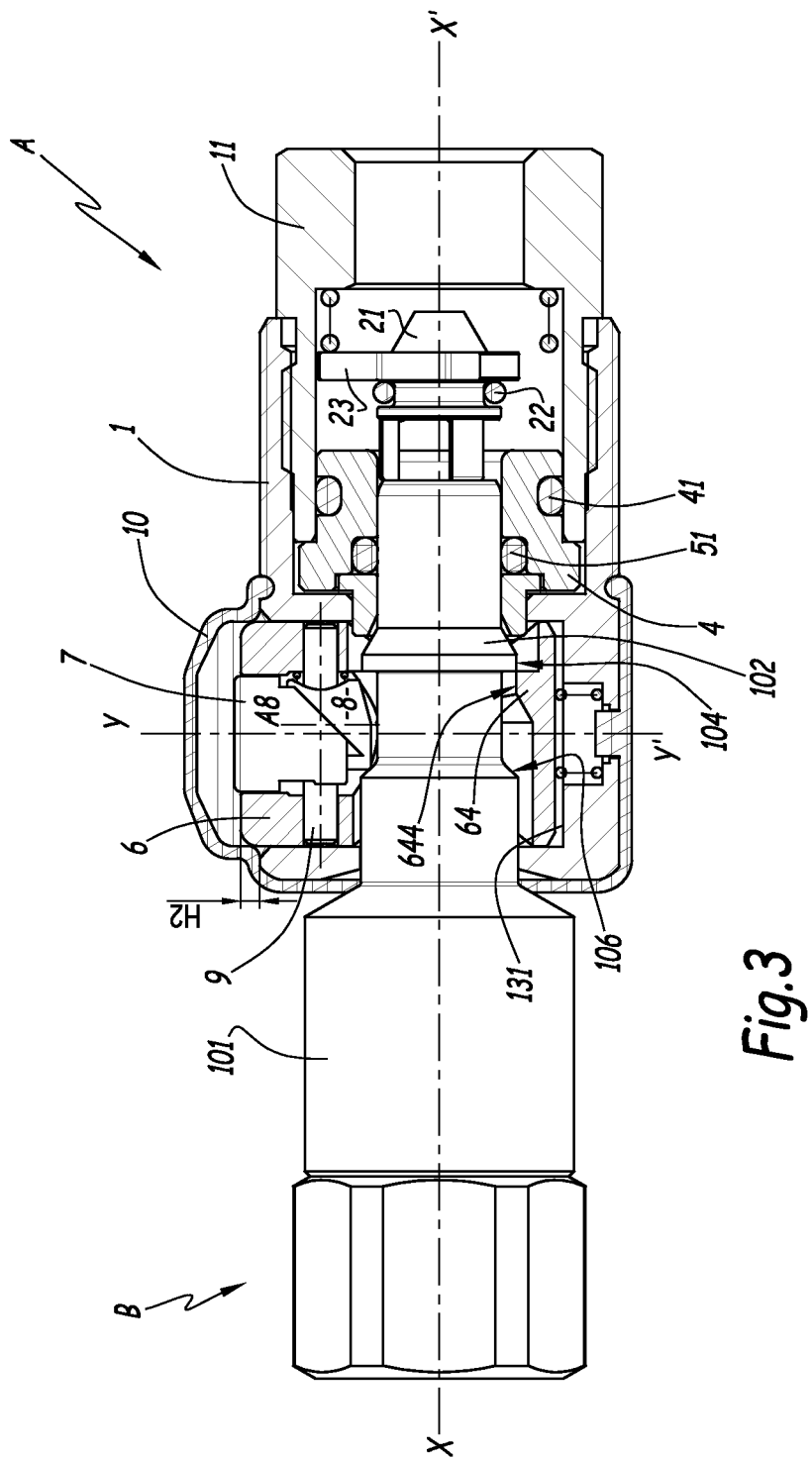

FIG. 3 shows the coupling at the end of the second connection step, in which the male element B has continued to progress into the female element A, pushing the gate 2 further outside its seat, into an open position, or second position, so as to allow the passage of the fluid between the male B and female A elements. The male element B being surrounded by the flanged bush 5, it remains centered on the longitudinal axis X-X'.

During the second connection step, the flange 102 of the male element B slides against the raised portion 64 of the bolt 6, until the cylindrical surface 104 of the flange 102 comes into contact with the cylindrical surface 644 of the bolt 6, which results in pushing the bolt 6 back toward the bottom 131 of the blind housing 13, opposite the return force exerted by the spring 3B, so as to allow the fitting of the male element B.

During the second connection step, the second frustoconical surface 106 of the male element B pushes the safety member 8 toward its proximal position, or second position, opposite the mouth 14 of the female element A, against the return force F3C exerted by the spring 3C.

The cooperation of the oblique surfaces 72 and 82 constitutes an angle member that causes the button 7, kept in contact with the safety member 8 by the cap 10, to move toward the bottom 131 of the blind housing 13, along the radial axis Y-Y', without the user actuating it. The oblique surfaces 72 and 82 slide in surface contact against each other during this movement.

A normal to the oblique surfaces 72 and 82 extends the plane passing through the axes X-X' and Y-Y'.

Thus, the movement of the safety member 8 along the axis X-X' and in a direction going from the distal end toward the proximal end of the female element A causes a radial movement of the button 7 toward the inside of the body 1 of the female element 1, along the axis Y-Y', in a first lowered position or unlocked position.

At the end of the second connection step, the bolt 6 is in a retracted or intermediate maintenance position in which it protrudes past the body 1 by a second height H2 smaller than the first height H1.

In the connected configuration of the coupling, or fitted fluid passage configuration, shown in FIGS. 4 and 5, the flange 102 of the male element B has protruded past the raised portion 64, which becomes housed in the groove 105 of the male element B, in contact with the shoulder 107. Thus, the spring 3B can push the bolt 6 back toward the deployed position.

Along the axis X-X', the male element B has reached a first fitting depth in which the coupling is in the fitted fluid passage configuration and in which the bolt 6 is in its first position. The fitting depth is measured between the distal end of the female element A and the distal end of the male element B.

The bolt 6 drives the safety member 8 with it toward the outside of the body 1, said safety member no longer being blocked in translation by the second frustoconical surface 106 of the male element B, such that the spring 3C pushes the safety member 8 back against the bolt 6 in its distal position, in contact with the cylindrical surface 108.

The movement of the safety member 8 causes the button 7 to move along the axis Y-Y' and opposite the bottom 131 of the blind housing 13, such that the button 7 is located in the high position.

Thus, the movement of the safety member 8 along the axis X-X' and in a direction going from the proximal end toward the distal end of the female element A causes a radial movement of the button 7 toward the outside of the body 1 of the female element 1.

In the connected configuration, the gate 2 is pushed back by the male element B outside its seat, in the open position, against the return force F3A of the spring 3A, so as to allow the passage of the fluid between the female element A and the male element B.

The bolt 6 axially retains the male element B in the female element A owing to the cooperation between the raised portion 64 and the shoulder 107 of the flange 102. The bolt 6 is in the deployed position and protrudes past the body 1 by a third height H3 greater than the second height H2 and equal to the first height H1.

The safety member 8 bears radially against the cylindrical surface 108 of the male element, on a zone diametrically opposite the raised portion 64. In other words, the normal to the contact extends in a radial direction. The safety member 8 thus keeps the male element B against the raised portion 64 of the bolt 6, which is diametrically opposite the bearing zone between the safety member 8 and the male element B, such that when the coupling is subject to vibrations, the movement of the movable parts of the coupling do not cause an untimely disconnection.

Thus, the safety member 8 keeps the bolt 6 in its deployed position when the male element B is fitted in the female element A.

Alternatively, the construction plays allow the safety member 8 to be located in a position diametrically opposite that bearing zone, without there being any actual contact between the safety member 8 and the male element B. However, the safety member 8 is then able to bear radially against the male element B.

FIGS. 6 and 7 show the coupling at the end of the first disconnection step, in which a user exerts a force F after moving the button 7 toward the bottom 131 of the housing 13, that force being oriented along the radial axis Y-Y' and moving the button 7 into its low position.

The button 7 emerges outside the bolt 6 in its high position when the coupling is in the fitted configuration, such that the force F exerted by the user is located on the button 7, the bolt 6 not being actuated directly by the user.

The safety member 8 then slides along the shaft 9 opposite the mouth 14 of the female element A, owing to the cooperation between the oblique surfaces 72 and 82, which produces an angle member. The button 7 thus pushes the safety member 8 back into its proximal position, against the return force F3C exerted by the spring 3C.

During the first disconnection step, the safety member 8 slides against the second frustoconical surface 106 of the male element B and bears against the bottom of the groove 105 until the proximal end 83 abuts against the shoulder 107.

The proximal part 83 of the safety member 8 abutting against the shoulder 107 constitutes an additional retaining means able to keep the male element B fitted in the female element A when the bolt 6 is in its lower position.

This additional retaining means is separate from the first retaining means 64 of the bolt 6 and the second retaining means 102 of the male element B.

Pushing the button 7 in causes the bolt 6 to move along the radial axis Y-Y' toward the bottom 131 of the blind housing 13, against the return force F3B exerted by the spring 3B.

The action F, which for example is manual, along the radial axis Y-Y' on the safety device, of which the button 7 is part, therefore causes the button 7 to be pushed in, i.e., causes it to move between its high position and its low position.

First, pushing the button 7 in causes the safety member 8 to slide radially toward the bottom 131 of the housing 13. Next, in the same disconnection sequence, pushing the button 7 causes the bolt 6 to be lowered along the radial axis Y-Y'.

At the end of the first disconnection step, the bolt 6 abuts against the bottom 131 of the blind housing 13, in a low position, or second position, such that the raised portion 64 is situated outside the groove 105 and no longer cooperates with the flange 102 of the male element B, so as to allow the male element B to be released from the first fitting depth.

The safety member 8 makes it possible to keep the male element B and the female element A fitted together as long as the bolt 6 is kept in its second position by the force F from the user on the safety device.

Figure 8:
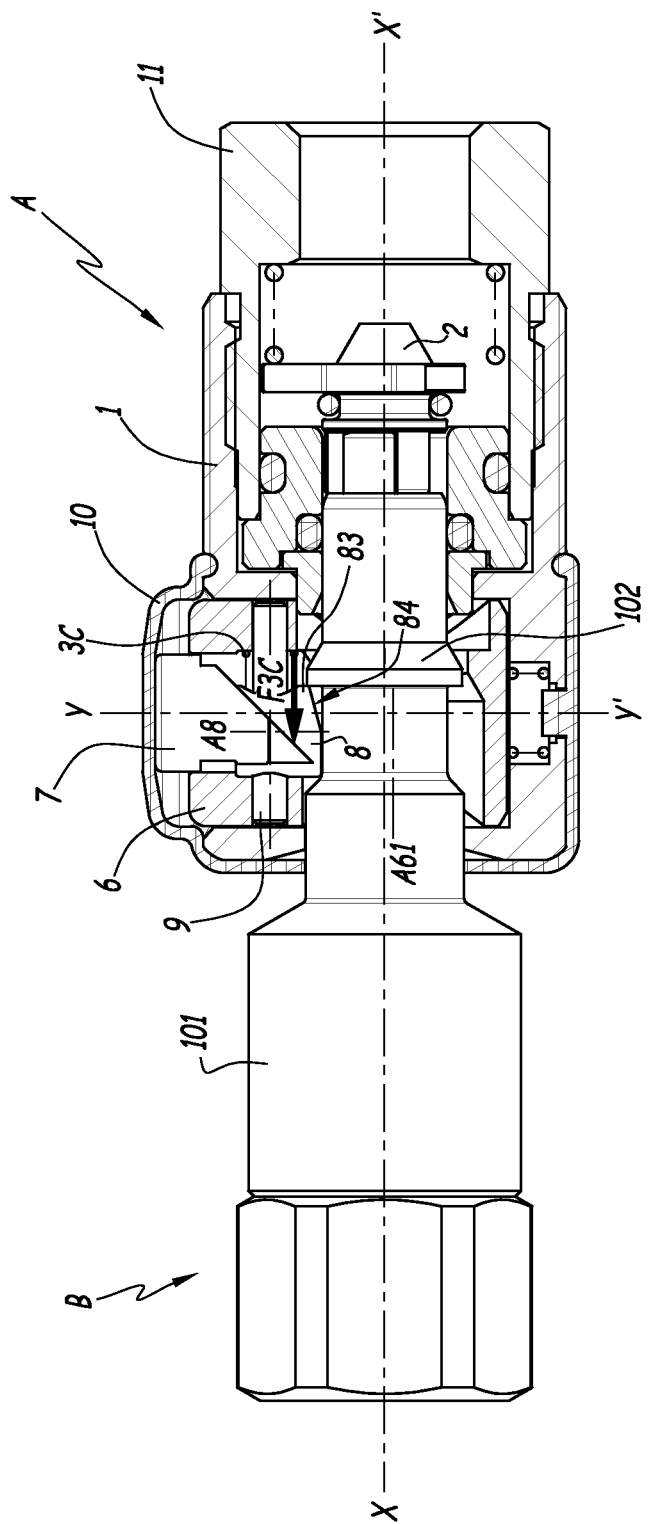
FIGS. 8 and 9 are partial cross-sections of the coupling of FIG. 1, at the end of second and third disconnection steps, respectively.

In a second disconnection step, the end of which is shown in FIG. 8, the user releases the force F exerted on the button 7, and the spring 3A pushes the gate 2 back toward its seat, the gate 2 then being in an intermediate position.

The gate 2 pushes the male element B outside the female element A, and the flange 102 of the male element B simultaneously pushes the safety member 8 back into its distal position, assisted by the return force F3C of the spring 3C.

The release of the force F exerted on the button 7 is accompanied by the sliding of the male element B outside the female element A, with gradual and controlled sliding between the cylindrical surface 104 of the male element B against the inclined surface 84 of the safety member 8.

The translational movement of the safety member 8 is accompanied by a radial movement of the button 7 toward its upper position, owing to the cooperation of the oblique surfaces 72 and 82. The coupling is then in a purge position in which the pressure drops, the male element B being retained in the female element A owing to the safety member 8. This intermediate position allows the male element B and the female element A to be disconnected without whiplash effect. In other words, the male element B is not violently ejected outside female element A.

Figure 9:
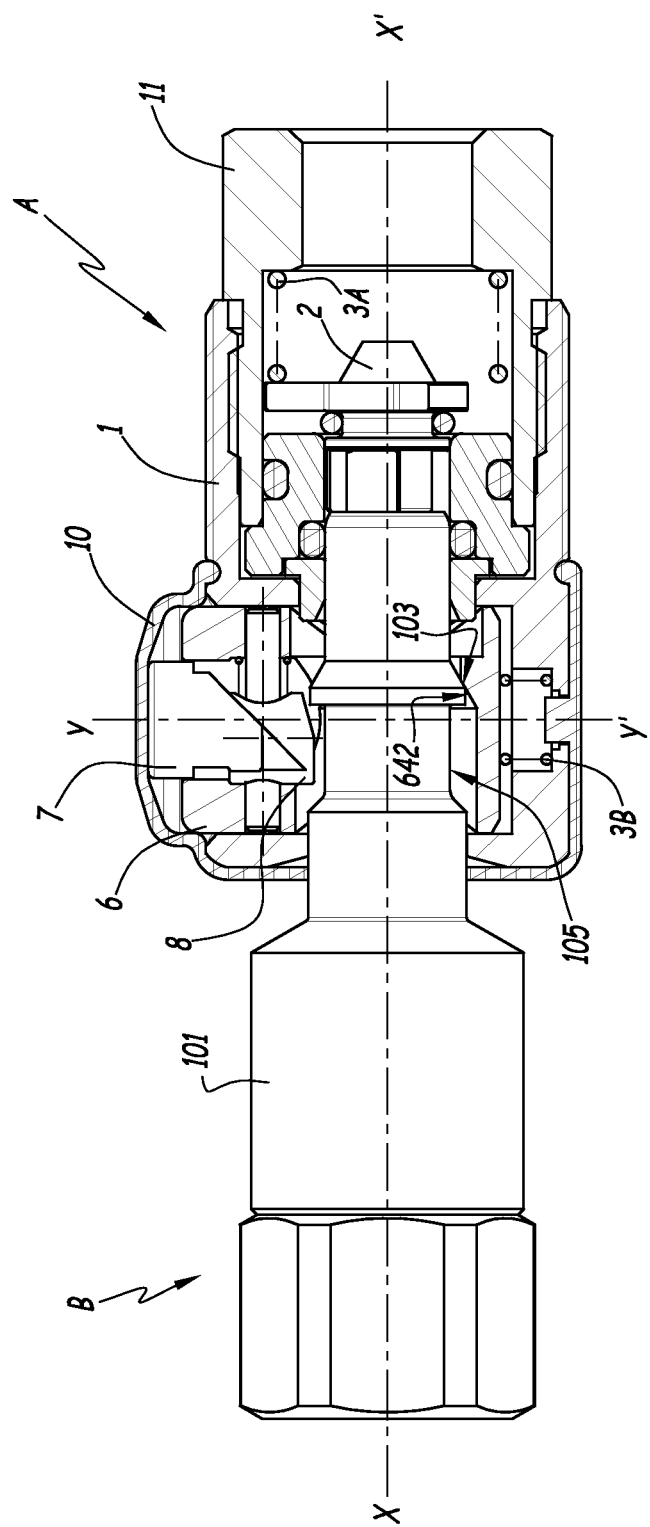

In a third disconnection steps shown in FIG. 9, the spring 3B pushes the bolt 6 back opposite the bottom 131 of the blind housing 13, the frustoconical surfaces 103 and 642 of the male element B and the bolt 6 then being in contact. The bolt 6 drives the safety member 8 along the radial axis Y-Y' and toward the outside. The safety member 8 disengages from the slot 105 and ceases to cooperate with the male element B, so as to allow the male element B to withdraw outside the female element A, until the spring 3A has pushed the gate 2 and the male element B back into the disconnected configuration of the coupling.

Figure 12:
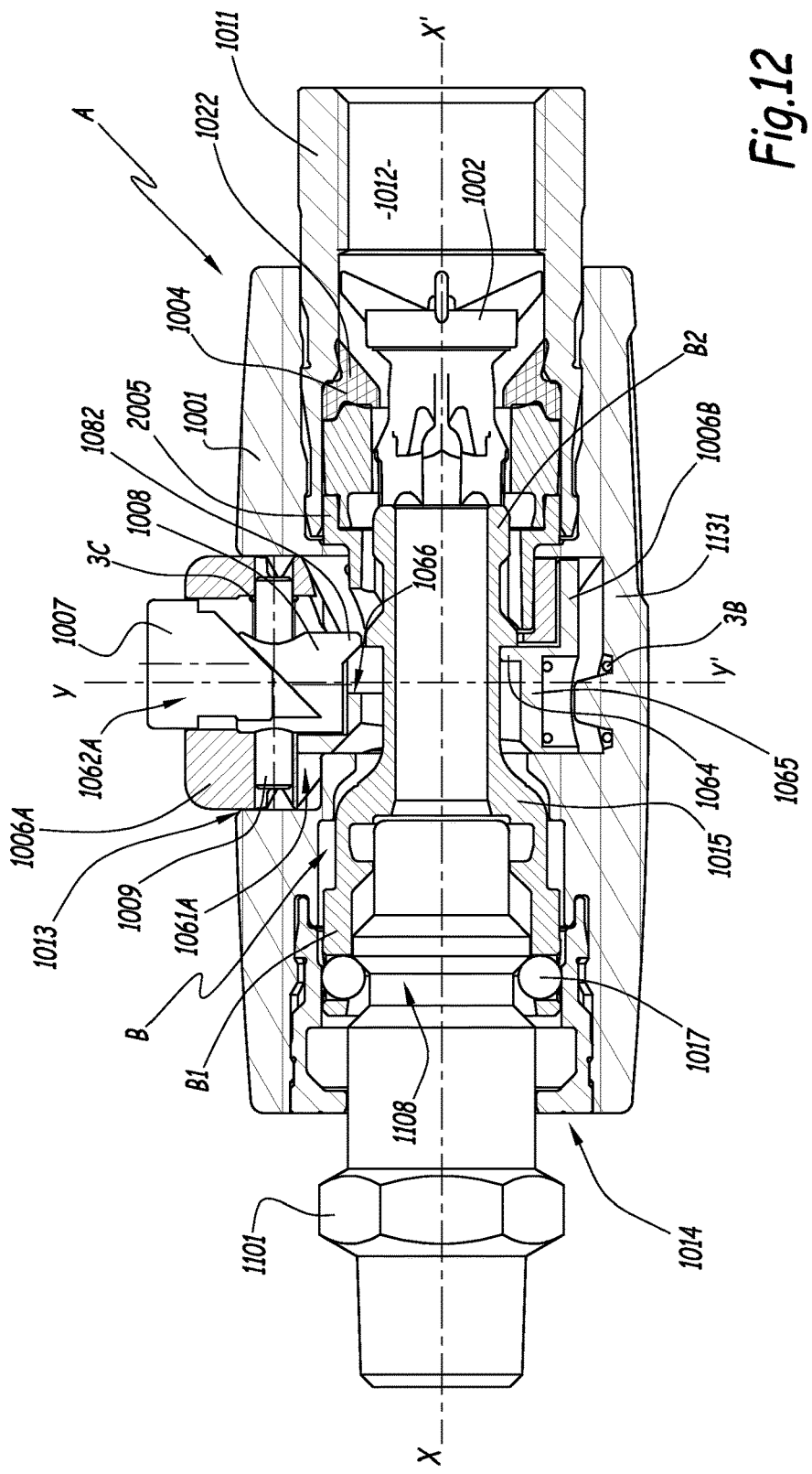
FIGS. 12 to 14 are longitudinal partial cross-sections of couplings according to second, third and fourth embodiment of the invention.

FIG. 12 shows a coupling of the single-pulse type according to a second embodiment of the invention. Hereinafter, the elements of the coupling of FIG. 12 that are similar to those of the coupling of FIGS. 1 to 11 bear the same numerical references, increased by 1000. The similar elements of the second embodiment will not be described in detail below.

The coupling of FIG. 12 comprises a male element 1101 and a female element A equipped with a ball adapter B housed inside the body 1001 of the female element A and having the same function as the intermediate part described in patent application EP 1,422,462.

At its distal end, this adapter B includes female means B1 for receiving and coupling with the male element 1101, while its other end defines a metal tip B2. This is therefore both a male and female coupling element.

The female element A is equipped with a two-part bolt 1006, slidingly mounted in the body 1001 of the female element A along a radial axis Y-Y'. The bolt 1006 is made up of a first part or outer part 1006A and a second part or inner part 1006B that is received in a hollow housing 1061A of the outer part 1006A emerging both toward a bottom 1131 of the blind housing 1013 of the female element A, and toward a mouth 1014 of the body 1001 via which a body 1101 of the male element B can be inserted.

The outer part 1006A also defines a globally circular opening 1062A that adjoins the housing. A bottom wall 1065 of the inner part 1006B is equipped with a first retaining means formed by a raised portion 1064.

The safety member 1008 is provided with retaining means such as a tooth 1082 that protrudes toward the adapter B. Thus, the safety device, more specifically the safety member 1008, comprises an additional retaining means formed by the tooth 1082 and able to keep the adapter B fitted in the female element A when the bolt 1006 is kept in its low position, or second position.

An inner wall of the inner part 1006B of the bolt includes a shoulder 1066 perpendicular to the axis X-X' and turned toward the proximal end of the female element A. This face 1066 constitutes an additional retaining means for the male element B.

Beads 1017 are housed in an annular groove formed in the female part of the adapter B. The beads 1017 are radially movable and able to keep the male tip 1101 in the configuration fitted in the adapter B. The male element 1101 includes an annular groove 1108 suitable for receiving the beads 1017, which are radially movable between a position in which they do not oppose the insertion of the male element 1101 and the adapter B, and a position in which the body 1001 of the female element A keeps the beads 1017 in the groove 1108 of the male element B so as to axially retain the male element 1101.

The operation of the coupling according to FIG. 12 is similar to the operation of the coupling of FIGS. 1 to 11, the bolt 1006 and the safety member 1008 blocking the adapter B in the configuration fitted in the female element A. The adapter B is able to keep the coupling in the fitted configuration when the bolt 1006 is in its first position, or deployed position. The bolt 1006 then keeps the adapter B at a first fitting depth, in the fitted fluid passage configuration.

Figure 13:
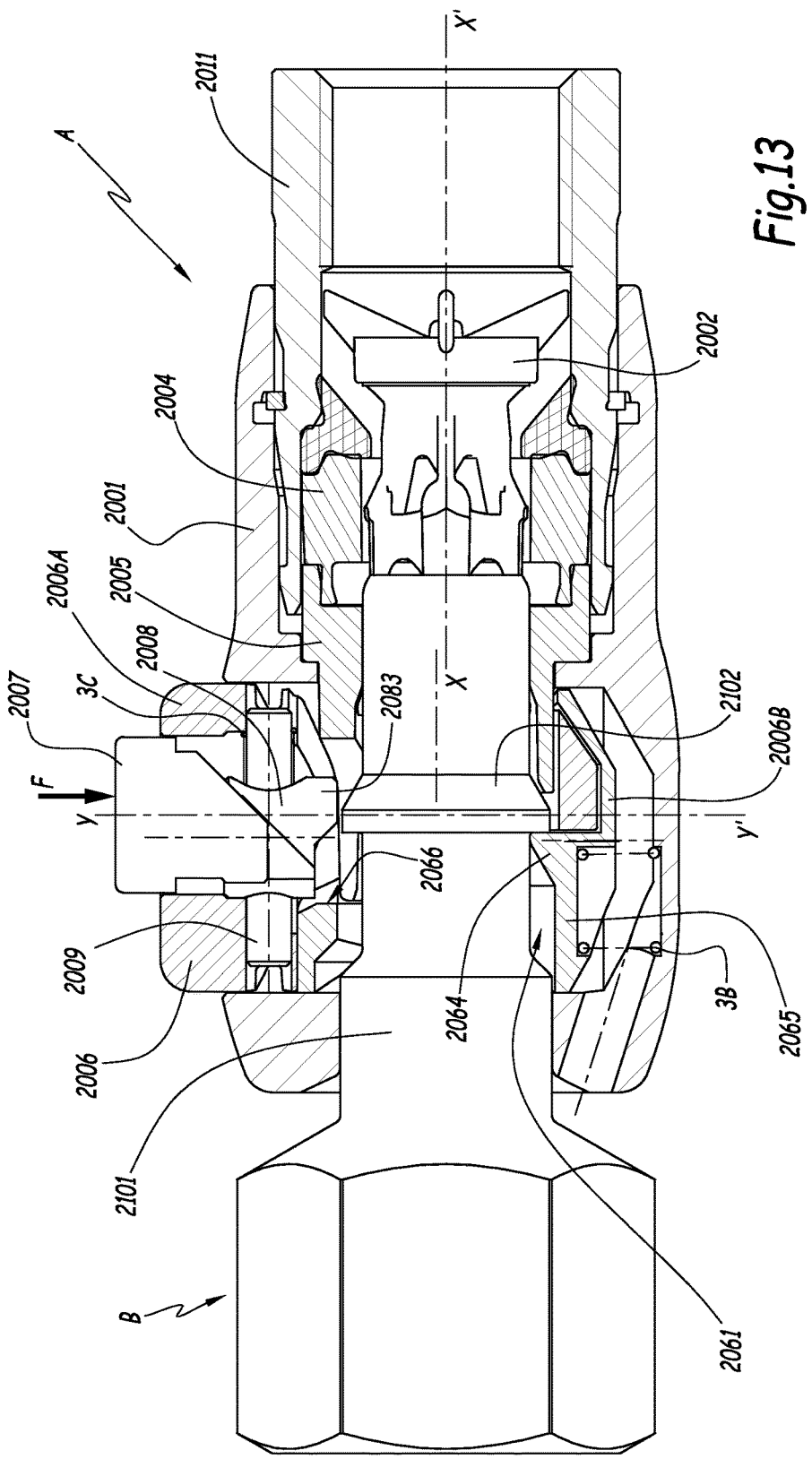

FIG. 13 shows a coupling of the single-pulse type according to a third embodiment of the invention, in which the elements similar to those of the coupling of FIGS. 1 to 11 bear the same numerical references, increased by 2000.

The coupling comprises a male element or tip 2101 that constitutes a male part B, as well as a female element A. The elements A and B are able to fit into one another along a longitudinal axis X-X'.

The female element A is equipped with a two-part bolt 2006 slidingly mounted in a body 2001 of the female element A along a radial axis Y-Y' and pierced with at least one opening 2061 for the fitting of the male element B. The bolt 2006 is made up of a first part or outer part 2006A and a second part or inner part 2006B. A bottom wall 2065 of the opening 2061 is equipped with a first retaining means formed by a raised portion 2064 of the inner part 2006B.

An inner wall of the inner part 2006B of the bolt includes a shoulder 2066 perpendicular to the axis X-X' and turned toward the proximal end of the female element A. This shoulder 2066 constitutes an additional retaining means for the male element B.

A coupling element 2011 is screwed inside the body 2001. A gate 2002 bears on a seal 2041 retained by a support 2004 bearing against a guide ring 2005 for the male element B.

The male element B comprises a flange 2102 that constitutes second retaining means.

The bolt 2006 is movable between a first position shown in FIG. 13, in which the raised portion 2064 is suitable for cooperating with the flange 2102 of the male element B to retain the male element B and the female element A in the fitted configuration.

In a second position of the bolt 2006, the bolt 2006 does not oppose the withdrawal of the male element B.

The female element A comprises a safety device able to keep the bolt 2006 in its first position. The safety device comprises a button 2007, a safety member 2008, a shaft 2009 and a spring 3C for returning the safety member to its distal position.

The safety member 2008 includes a raised element formed by a tooth 2083 diametrically opposite the raised portion 2064 in reference to the axis X-X'.

A manual action F on the button 2007 along the radial axis Y-Y' causes the bolt 2006 to move from its first position to its second position.

In the connected configuration, the male element B is kept fitted in the female element A by the tooth 2083, which blocks the flange 2102.

In light of the disconnection of the coupling, the manual action F on the button 2007 first causes the bolt 2006 to be lowered against the return force exerted by the spring 3B, which causes a partial withdrawal of the male element B outside the female element A and creates a drop in the pressure of the fluid in the coupling.

The pressure of the fluid in the coupling causes an additional withdrawal of the male element B. In that position, the male element B is no longer retained by the bolt 2006 or by the safety member 2008, and the coupling reaches its disconnected configuration.

Figure 14:
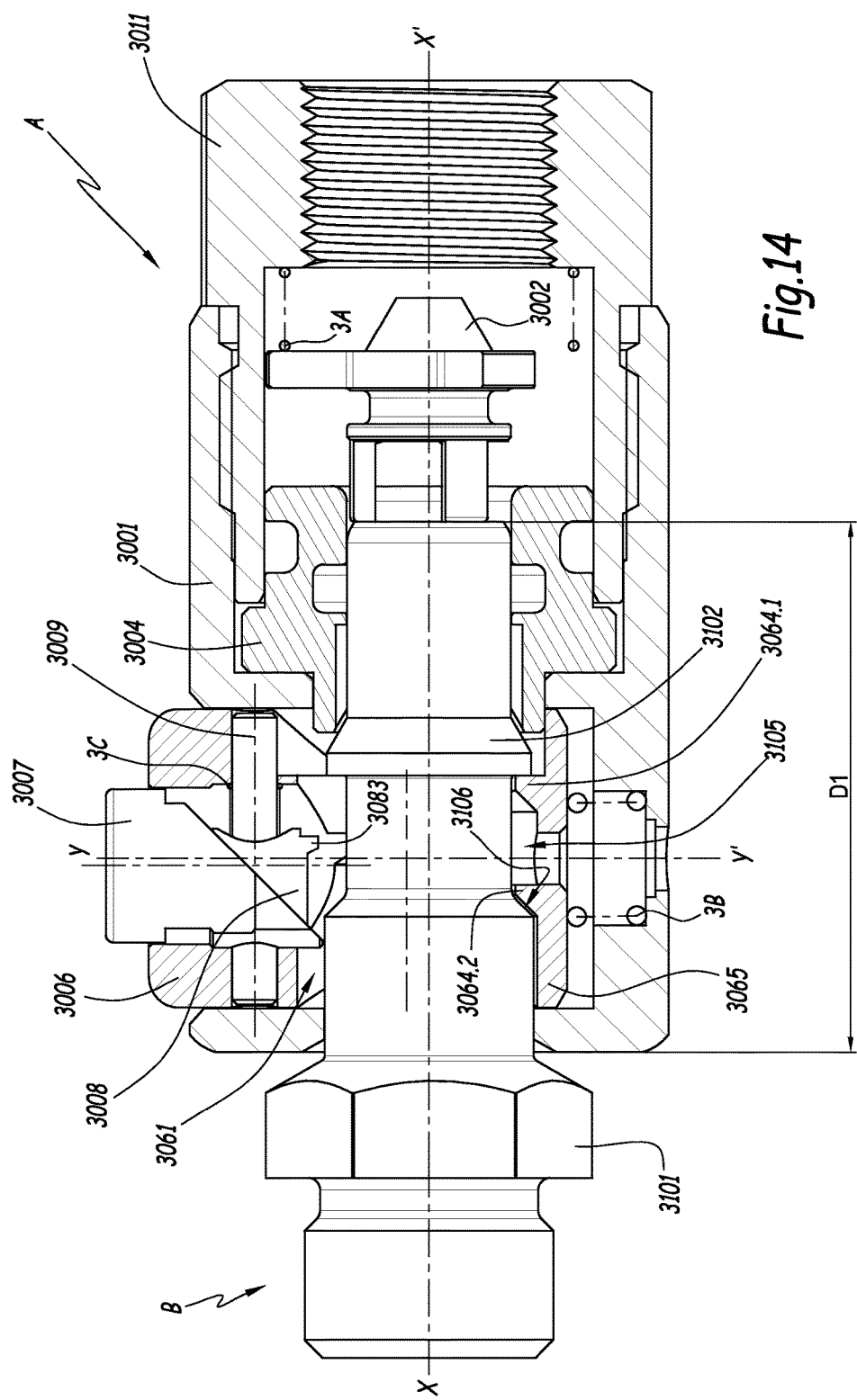

FIG. 14 shows a coupling of the double-pulse type according to a fourth embodiment of the invention, in which the elements similar to those of the first embodiment bear the same numerical references, increased by 3000.

The coupling comprises a male element or tip 3101 that constitutes a male part B, as well as a female element A. The elements A and B are able to fit into one another along a longitudinal axis X-X'.

The female element A is equipped with a bolt 3006 slidingly mounted in the body 3001 of the female element A along a radial axis Y-Y' and pierced with at least one opening 3061 for the fitting of the male element B. A bottom wall 3065 of the opening 3061 is equipped with a first retaining means and an additional retaining means that are respectively formed by raised portions 3064.1 and 3064.2.

A coupling element 3011 is screwed inside the body 3001. A gate 3002 bears on a guide ring 3004 for guiding the male element B.

The male element B comprises a flange 3102 that constitutes a second retaining means. The flange 3102 delimits a first edge of a slot 3105 arranged in the male element B. Opposite the flange 3102, the slot 3105 is delimited by a frustoconical surface 3106.

The additional retaining means 3064.2 of the bolt 3006 is separate from the first retaining means 3064.1 and the second retaining means 3102.

The bolt 3006 is movable between a first position shown in FIG. 14, in which the raised portions 3064.1 and 3064.2 can respectively cooperate with the flange 3102 and the frustoconical surface 3106 of the male element B to retain the male element B and the female element A in the fitted configuration, at a first fitting depth D1.

In a second position of the bolt 3006, the bolt 3006 does not oppose the withdrawal of the male element B.

The female element A comprises a safety member able to keep the bolt 3006 in its first position. The safety device comprises a button 3007, a safety member 3008 provided with a tooth 3083 diametrically opposite the raised portions 3064.1 and 3064.2 around the axis X-X', a shaft 3009 and a return spring 3C for returning the safety member 3008 to its distal position.

A manual action F on the button 3007 along the radial axis Y-Y' causes the bolt 3006 to move from its first position to its second position.

In light of the disconnection of the coupling, a first manual action F on the button 3007 causes the male element B to withdraw relative to the female element A, such that the male element B is released from the hold of the bolt 3006 and is found in a position in which the tooth 3083 keeps the male element B in the female element A, at a second fitting depth smaller than the first depth D1, in which the male element B is less pushed into the female element A than at the first fitting depth. When the male element B is fitted at the second fitting depth, the coupling is in a configuration closing off the passage for the fluid between the pipelines C1 and C2.

The tooth 3083 constitutes additional retaining means able to keep the male element B fitted in the female element A when the bolt 3006 is kept in its low position.

A subsequent second manual action F on the button 3007 causes the complete release of the male element B, so as to allow the disconnection.

In practice, the two manual actions F are performed by two similar successive bearing actions by the user on the button 3007.

The shape of the bolt 6, 1006, 2006 and 3006 is related to the type of disconnection of the coupling. For the couplings of the first, second and third embodiments, the bolts 6, 1006, 2006 include a single raised portion 64, 1064, 2064 for retaining the male part B. for the coupling of the fourth embodiment, the bolt 3006 includes raised portions 3064.1 and 3064.2 for retaining the male part B.

Alternatively, the angle member formed by the oblique surfaces 72 and 82 can be replaced by another device performing the same function.

The caps 10 of the couplings of the second, third and fourth embodiments have not been shown, but their placement is also provided to protect the couplings from dust and foreign items.

In the context of the invention, the various embodiments and alternatives that have been described may be combined, at least in part.

The invention claimed is:

1. A quick-acting coupling for the removable junction of two pipelines for conveying a fluid, the coupling comprising a male part and a female element that fit into one another along a longitudinal axis, the female element being equipped with:

a locking device slidingly mounted in a body of the female element along a radial axis of the female element and having at least one opening for fitting the male part, one wall of the opening being equipped with a first retaining means, the locking device being movable between:
- a first position in which the first retaining means cooperates with a corresponding second retaining means of the male part to retain the male part in the female element at a first fitting depth in a fitted fluid passage configuration,
- a second position in which the locking device allows the male part to release the female element outside the first fitting depth,
- a safety device to keep the locking device in the first position when the male part is in the configuration fitted in the female element;

wherein when the locking device is in the first position, a force on the safety device along the radial axis releases the locking device from the first position; and wherein the safety device includes a safety member slidably mounted on a shaft extending perpendicular to the radial axis and wherein the safety member is movable between:
- a first position in which the locking device locks the male part and the female element in the fitted configuration and in which the safety member can bear radially on the male part at an area diametrically opposite the first retaining means, and
- a second position in which the safety member does not bear on the male part.

2. The coupling according to claim 1, wherein the safety device includes an elastic means that urges the safety member back into the first position.

3. The coupling according to claim 1, wherein the safety device includes a button partially housed in the locking device and movable along the radial axis in the locking device.

4. The coupling according to claim 3, wherein the button is movable between an idle position and an unlocked position under a force exerted on the button along the radial axis.

5. The coupling according to claim 4, wherein the safety device includes a safety member slidably mounted on a shaft extending perpendicular to the radial axis, wherein the safety member is movable between a first position in which the locking device locks the male part and the female element in the fitted configuration and in which the safety member bears radially on the male part at an area diametrically opposite the first retaining means, and a second position in which the safety member does not bear on the male part and the safety member is movable from the first position to the second position by a force exerted on the button.

6. The coupling according to claim 5, wherein the button is movable along the radial axis under a movement of the safety member along the longitudinal axis.

7. The coupling according to claim 6, wherein the button and the safety member each include an oblique surface extending in a plane forming a non-zero angle with a longitudinal plane perpendicular to the radial axis, wherein a plane normal to the oblique surfaces extend in a plane passing through the longitudinal axis and the radial axis and wherein during the movement of the safety member from the first position to the second position, the oblique surfaces of the button and the safety member slide in surface contact with each other.

8. The coupling according to claim 7, wherein the non-zero angle is equal to 45°.

9. The coupling according to claim 1, wherein the male part includes an adapter housed inside the female element and having beads radially movable to maintain a male tip of the coupling in the configuration fitted in the adapter, when the locking device is in the first position in which the locking device retains the adapter at a first fitting depth of the adapter in the female element and in the fitted fluid passage configuration.

10. The coupling according to claim 1, wherein the safety device includes an additional retaining means to retain the male part fitted in the female element when the locking device is in the second position.

11. The coupling according to claim 1, wherein the locking device includes a first part and a second part housed inside the first part.

12. The coupling according to claim 1, wherein the locking device includes an additional retaining means to retain the male part in the female element at a second fitting depth in a configuration closing off the fluid passage between the pipelines.

13. The coupling according to claim 1, wherein during an intermediate connection step, the male part pushes the safety member back toward the second position.

14. The coupling according to claim 1, wherein an enclosure is positioned on the female element and covers the button and the locking device.

15. The coupling according to claim 14, wherein the enclosure is a cap made from an elastic material.

16. The coupling according to claim 10, wherein the additional retaining means is a tooth.

* * * * *